United States Patent [19]

Stoll

[11] Patent Number: 5,793,504
[45] Date of Patent: Aug. 11, 1998

[54] HYBRID ANGULAR/SPATIAL HOLOGRAPHIC MULTIPLEXER

[75] Inventor: Harold McDowell Stoll, Rancho Palos Verdes, Calif.

[73] Assignee: Northrop Grumman Corporation, Los Angeles, Calif.

[21] Appl. No.: 695,245

[22] Filed: Aug. 7, 1996

[51] Int. Cl.$^6$ ............... G03H 1/10; G03H 1/12; G03H 1/02; G11C 13/04

[52] U.S. Cl. ............... 359/11; 359/10; 359/3; 359/7; 359/28; 359/32; 359/24; 365/125; 365/216; 365/124

[58] Field of Search ............... 359/3, 7, 10, 11, 359/21, 28, 30, 32, 24; 365/125, 124, 216; 369/103

[56] References Cited

U.S. PATENT DOCUMENTS

| | | | |
|---|---|---|---|
| 3,572,881 | 3/1971 | Nishida et al. | 350/3.5 |
| 3,624,278 | 11/1971 | Heckscher | 178/5.2 |
| 3,627,400 | 12/1971 | Caulfield | 350/3.5 |
| 3,627,401 | 12/1971 | Kirk | 350/3.5 |
| 3,674,332 | 7/1972 | Kogelnik | 350/3.5 |
| 3,697,149 | 10/1972 | Van Heeckeren et al. | 350/3.5 |
| 3,795,768 | 3/1974 | Locke | 178/7.6 |
| 3,936,140 | 2/1976 | Ruell | 350/3.5 |
| 3,972,582 | 8/1976 | Oosaka et al. | 350/7 |
| 4,411,489 | 10/1983 | McGrew | 350/3.76 |
| 4,566,031 | 1/1986 | Kirk | 358/90 |
| 5,007,690 | 4/1991 | Chern et al. | 350/3.68 |
| 5,098,176 | 3/1992 | Wolf | 359/11 |
| 5,416,616 | 5/1995 | Jenkins et al. | 359/11 |
| 5,548,419 | 8/1996 | Adrian et al. | 359/24 |
| 5,550,779 | 8/1996 | Burr et al. | 359/3 |
| 5,661,577 | 8/1997 | Jenkins et al. | 359/11 |

*Primary Examiner*—Thong Nguyen
*Assistant Examiner*—Audrey Chang
*Attorney, Agent, or Firm*—Terry J. Anderson; Karl J. Hoch, Jr.

[57] ABSTRACT

A plurality of holograms are simultaneously angularly and spatially multiplexed within a storage medium by writing the holograms at different locations within the storage medium using reference and object beams directed thereto via cooperating reference beam and object beam scanners, respectively. The simultaneously angular and spatially multiplexed holograms are subsequently read-out by directing a reference beam through a desired location within the storage medium using the reference beam scanner. The reference beam is directed from the storage medium to a phase conjugator which conjugates the phase of the reference beam and directs the phase conjugated reference beam back to the same desired location within the storage medium so as to excite a corresponding conjugate object beam which is then directed onto a detector array.

25 Claims, 4 Drawing Sheets

HYBRID ANGULAR/SPATIAL HOLOGRAPHIC MULTIPLEXER

FIELD OF THE INVENTION

A device and method for storing a plurality of angle-multiplexed holograms in a single storage medium via spatial multiplexing utilizes synchronous scanning of the object and reference beams throughout the storage medium.

BACKGROUND OF THE INVENTION

Holographic techniques for storing images are well known. Such techniques are commonly used to store images in a wide variety of different applications. Additionally, various methodologies for utilizing such holographic techniques to store digital data for use in computer systems are currently being explored.

The technique for forming holograms comprises splitting the highly coherent output beam of a laser into separate reference and object beams. The reference beam is directed onto the holographic storage medium, e.g., a photo-refractive material, while the object beam is directed onto the object whose image is to be stored. Light from the object is directed to the photo-refractive medium wherein an interference pattern is formed due to the interaction of the reference beam and the object beam.

To form holograms for the storage of digital data, the object beam typically passes through a spatial light modulator, e.g., a liquid crystal shutter matrix, rather than being reflected off of an object, in order to form the holographic image.

Regardless of the application (i.e., the storage of images or data), subsequently directing a reference beam onto the holographic storage medium results in the reconstruction of an image representative of the originally illuminated object or stored digital data.

Also known are techniques for storing a plurality of such images within a single photo-refractive medium via angle-multiplexing of the reference beams. Such angle-multiplexing is discussed in "THEORY OF OPTICAL INFORMATION STORAGE IN SOLIDS," *Applied Optics*, Vol. 2, No. 4, p. 393 (1963). The method of angle-multiplexing generally involves maintaining a constant angle for the object beam, while varying the angle of the reference beam for each exposure. Angle-multiplexing thus allows a large number of holograms to be stored within a common volume of photo-refractive medium, thereby greatly enhancing the storage density thereof.

However, one problem commonly associated with the use of such angle-multiplex holograms is that the geometry of contemporary systems limits the number of holograms that can be stored within a given volume of a particular storage medium to a single set of angle-multiplexed holograms. Thus, the number of individual holograms that can be stored within a given volume of a particular storage medium is limited by the diffraction efficiency of the stored holograms, which varies inversely with the number of holograms stores.

Although it is known to store more than one set of angle-multiplexed holograms within a single storage medium via spatial multiplexing, as discussed in "SPATIALLY-AND ANGLE-MULTIPLEXED HOLOGRAPHIC RANDOM ACCESS MEMORY", SPIE Vol. 1773, p. 334, (1992), no practical method for doing so has been devised due to the requirement for replicated delivery objects, i.e., the use of multiple spatial light modulators and detector arrays as well as other associated optics. The use of such replicated optics is impractical due to space limitations and alignment requirements. Thus, such contemporary angle/spatial multiplexed holograms have not, to date, been satisfactorily demonstrated due to the complexity thereof.

As such, it would be beneficial to provide a means for forming and reading such angle/spatial multiplexed holograms so as to eliminate the requirement for multiple spatial light modulators, detector arrays, and other associated optics, thereby facilitating the practical application of angle/spatial multiplexing of holograms.

SUMMARY OF THE INVENTION

The present invention specifically addresses and alleviates the above mentioned deficiencies associated with the prior art. More particularly, the present invention comprises a hybrid angular/spatial holographic multiplexer comprising a storage medium, a reference beam scanner for scanning a reference beam angularly and spatially through the storage medium, and an object beam scanner for scanning an object beam angularly and spatially through the storage medium. A spatial light modulator modulates a laser beam so as to form the object beam. A phase conjugator conjugates the reference beam during read-out operations so as to excite a corresponding conjugate object beam. A detector array converts the conjugate object beam into an electrical signal representative of the stored hologram. Thus, the reference beam scanner and the object beam scanner cooperate to form a plurality of angular/spatial multiplexed holograms within the storage medium.

The store medium is preferably comprised of Fe:LiNbO$_3$. A circuit is preferably provided for shorting opposing surfaces of the storage medium so as to remove extraneous charge typically generated by the object and reference beams therein during both write and read-out processes.

According to the preferred embodiment of the present invention, both the reference beam scanner and the object beam scanner are configured so as to spatially overlap adjacent angle/spatial multiplexed holograms in a manner which evenly distributes exposure of the storage medium to the reference beam and thereby mitigates undesirable optical damage to the storage medium (which results from buildup of the aforementioned extraneous charge). The reference beam scanner and the object beam scanner are preferably configured to uniformly distribute holograms throughout substantially the entire storage medium, so as to enhance or optimize the storage density thereof.

The reference beam scanner preferably comprises a planar scanning mirror for directing the reference beam to different portions of the storage medium. The object beam scanner preferably comprises a scanning Mangin mirror for similarly directing the object beam to different portions of the storage medium.

An optical switch prevents the reference beam from being incident upon the phase conjugator during write operations and allows the reference beam to be incident upon the phase conjugator, as well as reflected thereby, during read-out operations.

According to the preferred embodiment of the present invention, a wedge directs the reference beam from the storage medium toward the phase conjugator and a lens focuses the reference beam directed by the wedge onto the phase conjugator. Those skilled in the art will appreciate that various other optical elements may be utilized for directing and focusing the reference beam onto the phase conjugator, as desired.

A beam splitter transmits the object beam to the storage medium during write operations and reflects the conjugate object beam to the detector array during read-out operations. A polarization rotator transmits the object beam (without changing its polarization state) to the storage medium during write operations and rotates the polarization of the excited corresponding conjugate object beam during read-out operations so as to cause the beam splitter to reflect the excited corresponding conjugate object beam to the detector array during read-out operations.

Thus, the method for angularly and spatially multiplexing a plurality of holograms within a storage medium according to the present invention comprises the steps of writing a plurality of holograms at different locations within the storage medium using reference and object beams directed thereto via cooperating reference beam and object beam scanners, respectively; and reading out selected holograms via a reference beam directed to a desired location within the storage medium using the reference beam scanner. The reference beam is directed from the storage medium to a phase conjugator which conjugates the phase of the reference beam and directs the phase conjugated reference beam back to the same desired location within the storage medium so as to excite a corresponding conjugate object beam which is then directed onto a detector array.

These, as well as other advantages of the present invention will be more apparent from the following description and drawings. It is understood that the changes and the specific structure shown and described may be made within the scope of the claims without departing from the spirit of the invention.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

Figure 1:
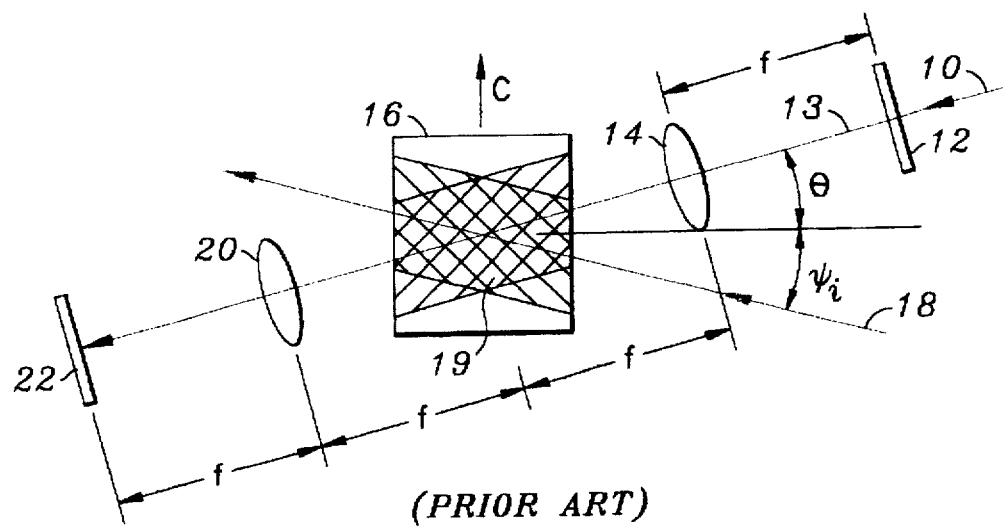
FIG. 1 is a schematic representation of a contemporary geometry utilized to store multiple Fourier-space holograms within a common volume of storage medium via angle multiplexing.
Figure 2:
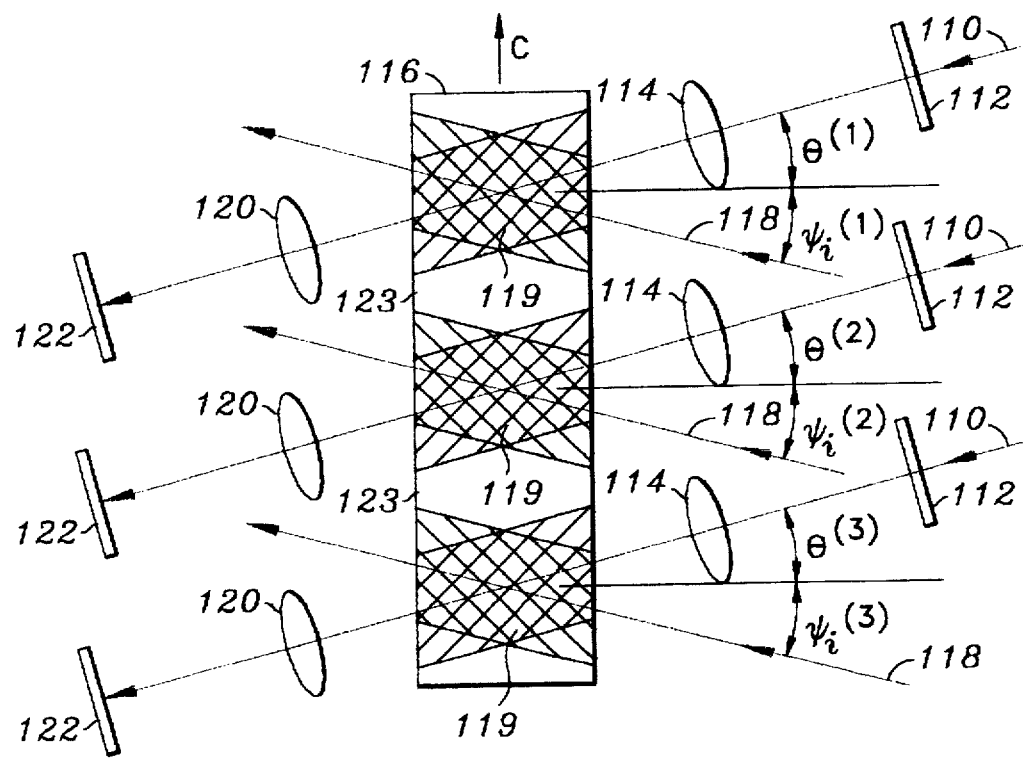
FIG. 2 is a schematic representation of a contemporary proposed geometry for storing multiple angle-multiplexed holograms within a single storage medium via spatial multiplexing.

The hybrid angular/spatial holographic multiplexer of the present invention is illustrated in FIGS. 3–7 which depict a presently preferred embodiment of the invention. The FIGS. 1 and 2 depict prior art methodologies. The c-axis of the preferred holographic storage medium ($Fe:LiNbO_3$) is up, as shown in FIGS. 1–7.

Referring now to FIG. 1, the geometry for storing multiple Fourier-space holograms within a common volume of storage medium via angle multiplexing according to contemporary methodology is shown. A collimated laser beam 10 is directed through a spatial light modulator (SLM) 12 and focusing optics 14 from which the laser beam is directed into storage medium 16. The spatial light modulator 12 adds digital data to the laser beam to form an object beam.

Simultaneously, collimated reference beam 18 is directed into the same location within the storage medium 16 such that the object beam 13 and the reference beam 18 interfere with one another so as to form a hologram 19 according to well known principles. As those skilled in the art will appreciate, the object beam and the reference beam are typically formed from a common collimated laser beam via a beam splitter (not shown).

By varying the angle, $\theta$ or $\psi_i$, of one of the two beams during sequential exposures, typically the angle $\psi_i$ of the reference beam 18, a plurality of such holograms may be formed within a common spatial volume within the storage medium 16, as discussed above.

Reconstruction of the object beam so as to facilitate read-out of the hologram 19 is facilitated by directing the collimated reference beam 18 into the storage medium 16, without directing any object beam thereinto. Output optics 20 focus the hologram so formed onto detector array 22 which then converts the optical signal into an electrical signal.

The spatial light modulator 12 is one focal length of the focusing optics 14 spaced apart therefrom; the focusing optics 14 are one focal length thereof spaced apart from the (nominal) center of storage medium 16; the (nominal) center of the storage medium 16 is one focal length of the output optics 20 spaced apart therefrom; and the detector array 22 is one focal length of the output optics 20 spaced apart therefrom.

Since the diffraction efficiency of the stored holograms varies inversely with the square of the number of holograms stored, such contemporary geometry defines the limiting number of holograms which can be stored within a given volume of a particular storage medium.

Referring now to FIG. 2, it has been found that a plurality of such angle multiplexed sets of holograms may be formed within a single storage medium, thereby enhancing the storage capacity thereof. More particularly, a plurality of collimated laser beams 110 are directed through a complimentary plurality of spatial light modulators 112 and focusing optics 114 in a manner analogous to that utilized in simple angle multiplexing, as described in conjunction with FIG. 1 above. A corresponding plurality of reference beams 118 are directed into the storage medium 116 so as to form a plurality of separate holograms 119 within the storage medium 116.

During reading, reference beams 118 are incident on storage medium 116 at angles $\psi_i^{(1)}$, $\psi_i^{(2)}$, and $\psi_i^{(3)}$, and, thereby, reconstruct holograms 119, which are then Fourier-transformed by lenses 120 and finally imaged onto detector arrays 122.

However, spatial multiplexing of a plurality of different sets of angle multiplexed holograms according to such contemporary methodology suffers from a number of substantial limitations, thus rendering such methodology impractical in the marketplace.

For example, such contemporary spatial multiplexing methodologies are extremely complex, require duplicate or multiple optical elements, and are thus expensive and difficult to align and maintain in alignment. Indeed, such contemporary methodologies have, to date, not been satisfactorily demonstrated.

Further, such contemporary storage geometry requires that individual storage volumes be maintained at spatially separate locations so as to prevent simultaneous excitation, i.e., recall of the holograms stored in two or more adjacent volumes by a common reference beam. Thus, each individual set of storage locations 119 must be separated from each adjacent set 119 via dark spaces 123 so as to mitigate such undesirable simultaneous excitation. As noted below, such dark spaces accumulate charges which, in turn, induce photo-refractive optical "damage" (i.e., unwanted scattering and beam defocusing) within storage regions 119.

Figure 3:
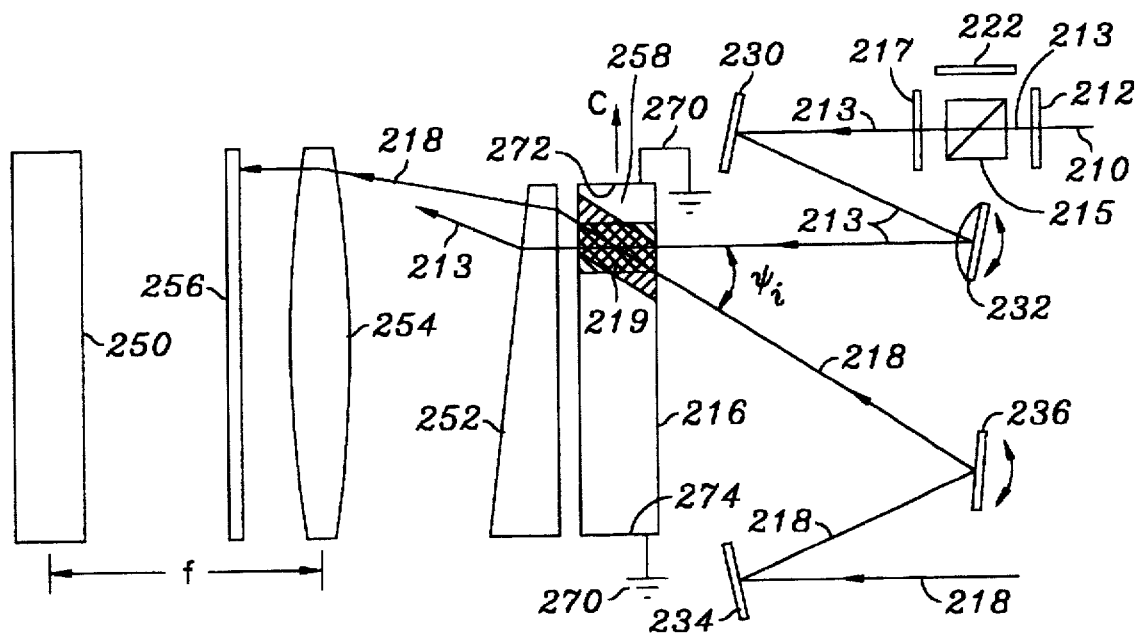
FIG. 3 is a schematic representation of the geometry for storing a plurality of holograms in a single storage medium via hybrid angular/spatial multiplexing according to the present invention, and more particularly illustrating the writing of holograms near the top of the storage medium.

Referring now to FIG. 3, a device and methodology for hybrid angular/spatial holographic multiplexing according to the present invention is shown. A collimated laser beam 210 is modulated by spatial light modulator 212 to form object beam 213 which is then transmitted through beam splitter 215 and polarization rotator 217, neither of which substantially affect the object beam 213. The object beam 213 is incident upon a fixed mirror 230 which reflects the object beam 213 to articulated or scanning Mangin mirror 232. The scanning Mangin mirror 232 reflects the object beam 213 to the storage medium 216 at a location where it is desired to form a hologram.

Simultaneously, a reference beam 218 is reflected by fixed mirror 234 onto articulated or scanning reference beam mirror 236 which reflects the reference beam 218 to the same desired location within storage medium 216, so as to cause the object beam 213 and reference beam 218 to interfere and form a hologram within the storage medium 216, according to well known principles.

As those skilled in the art will appreciate, the object beam 213 and the reference beam 218 are typically formed from a common laser beam via a beam splitter (not shown), so as to assure a fixed relative phase difference between the object beam 213 and the reference beam 218.

Figure 4:
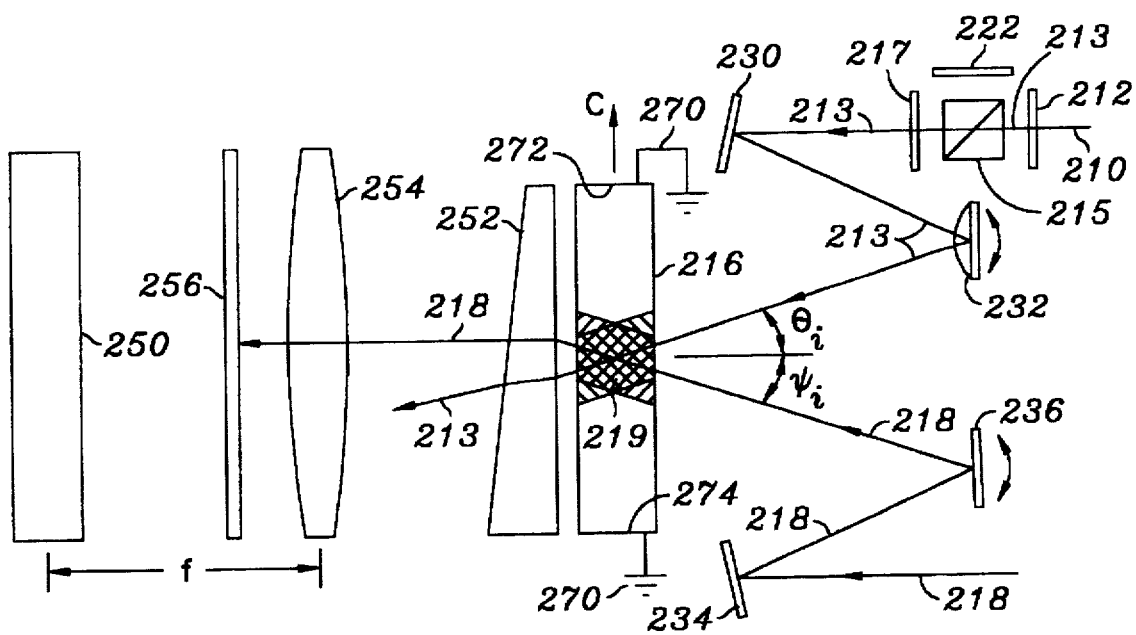
FIG. 4 is a schematic representation of the geometry for storing a plurality of holograms in a single storage medium via hybrid angular/spatial multiplexing according to the present invention, and more particularly showing the writing of holograms near the center of the storage medium.
Figure 5:
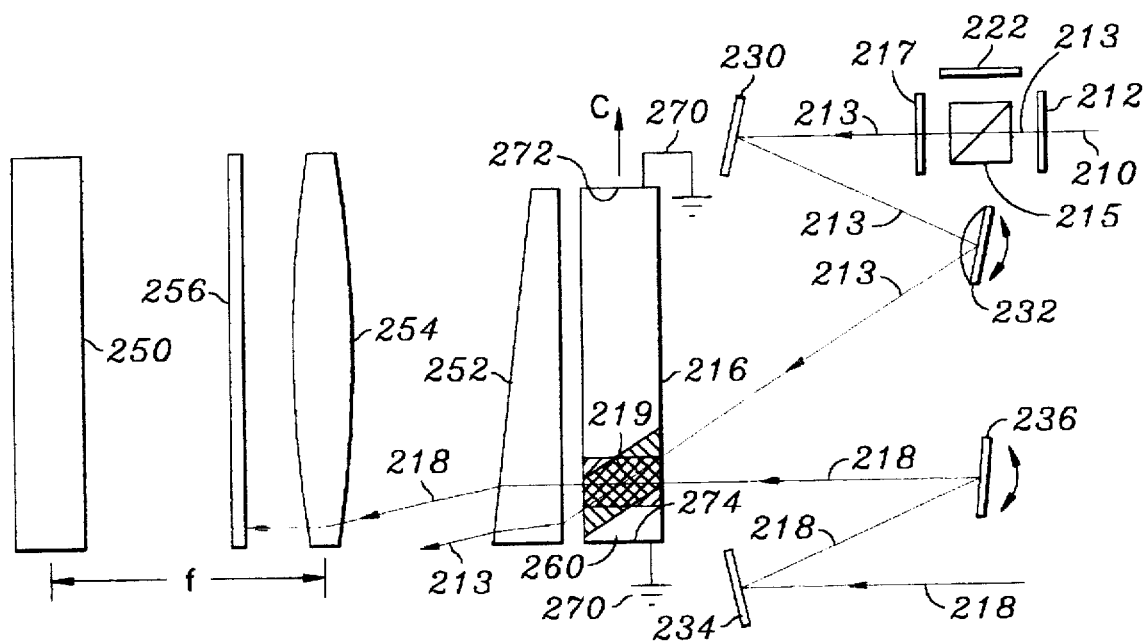
FIG. 5 is a schematic representation of the geometry for storing a plurality of holograms in a single storage medium via hybrid angular/spatial multiplexing according to the present invention, and more particularly showing the writing of holograms near the bottom of the storage medium.

As shown in FIG. 3, the object beam scanning mirror 232 and the reference beam scanning mirror 236 are oriented so as to form a hologram 219 near the top of the storage medium 216. FIG. 4 shows the object beam mirror 232 and the reference beam mirror 236 oriented so as to form a hologram 219 near the middle of the storage medium 216 and FIG. 5 similarly shows the object beam mirror 232 and the reference beam mirror 236 oriented so as to form a hologram 219 near the bottom of the storage medium. The angle $\theta_i$ between the object beam 213 and a normal to the surface of the storage medium 216, and the angle $\psi_i$ between the reference beam 218 and a normal to the surface of the storage medium 216, are different for each hologram so stored. Thus, as will be appreciated by those skilled in the art, a plurality of such holograms 219 may be formed throughout the storage medium 219.

The geometry of the present invention effects the formation of Fourier planes of the object and reference beams which are disposed nominally at the center of the storage medium since the object and reference beams are positioned to interfere at the center of the storage medium. These Fourier planes do not need to overlap one another at every storage location, since phase conjugation is utilized to reconstruct the various data-bearing object beams. However, faithful object beam reconstruction does require that aberrations introduced within the object beam do not prevent efficient and uniform storage of all components of every object beam angular spectrum component.

According to the preferred embodiment of the present invention, an exposure schedule defines the order and intensity with which the holograms 219 are formed within the storage medium 216 such that the storage medium is ultimately uniformly illuminated, i.e., contains a uniform density of holograms throughout, or from top to bottom thereof according to the present invention. As taught in "STORAGE OF 500 HIGH-RESOLUTION HOLOGRAMS IN A LiNbO$_3$ CRYSTAL", Optics Letters, Vol. 16, No. 8, p. 605 (1991), the use of an exposure schedule has been proven to be helpful in minimizing diffraction efficiency degradation. According to such exposure schedules, earlier stored holograms are formed utilizing more intense object and reference beams than later stored holograms, such that each subsequent write process tends to lower the diffraction efficiency of the earlier stored holograms in a manner which substantially equalizes the diffraction efficiency of all stored holograms. Thus, according to such exposure schedules, each succeeding hologram is stored using a lower intensity than the preceding hologram.

Further, photo-refractive optical damage (see, for example, F. el Guibaly and L. Young in "OPTICALLY INDUCED LIGHT SCATTERING AND BEAM DISTORTION IN IRON-DOPED LITHIUM MOBATE," Ferroelect, Vol. 46, p. 201–208 (1983) is preferably minimized by spatially overlapping, preferably in small spatial increments, adjacent holograms so as to average exposure of the storage medium to the reference and object beams. Thus, exposure of the storage medium to the reference and object beams is substantially equal at all locations within the storage medium 216. Residual dark spaces 258 (FIG. 3) and 260 (FIG. 5) may be illuminated by appropriately scanning reference beam 118 throughout these extreme (non-information-bearing) regions of storage medium 216. Such illumination serves to force all non-productive charge (i.e., that charge which induces photo-refractive optical damage) to migrate toward the ends (272 and 274) of the storage medium.

The storage medium 216 is preferably comprised of Fe: LiNbO$_3$, which has known photo-refractive properties. Shorting circuit 270 shorts opposed ends 272 and 274 of the storage medium 216 together so as to mitigate the buildup of the non-productive charge (noted above) which is generated during both the write and read-out operations. As those skilled in the art will appreciate, this charge must be dissipated so as to prevent it from interfering with the formation of holograms during write operations and with the recall of holograms during read operations.

Perfect spatial alignment of the data page, i.e., that data originally modulated onto the object beam via spatial light modulator 212, with respect to detector array 222 is achieved by selecting the detector array and the spatial light modulator such that they each have the same pixel pitch (i.e., physical, center-to-center spacing in both dimensions), or where the pixel pitch of the spatial light modulator is an integral multiple of the pixel pitch of the detector array. Additionally the optical path between the object beam fixed mirror and the spatial light modulator is equal to the optical path between the object beam fixed mirror and the detector array.

Thus, by utilizing the components and geometry of the present invention, optically fast and compact reference and object beam delivery optics may be utilized. This is possible because the phase conjugate recovery process utilized during read operations reverses phase distortions introduced by this type of inexpensive delivery system.

Figure 6:
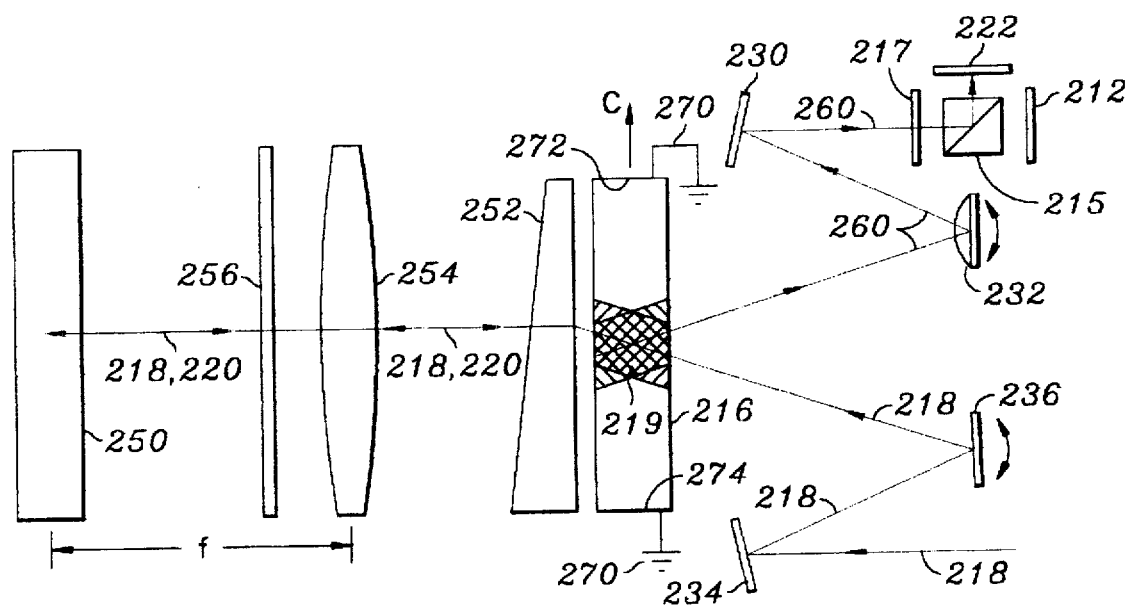
FIG. 6 is a schematic representation of the geometry for storing a plurality of holograms in a single storage medium via hybrid angular/spatial multiplexing according to the present invention, and more particularly showing the reading of holograms near the center of the storage medium.
Figure 7:
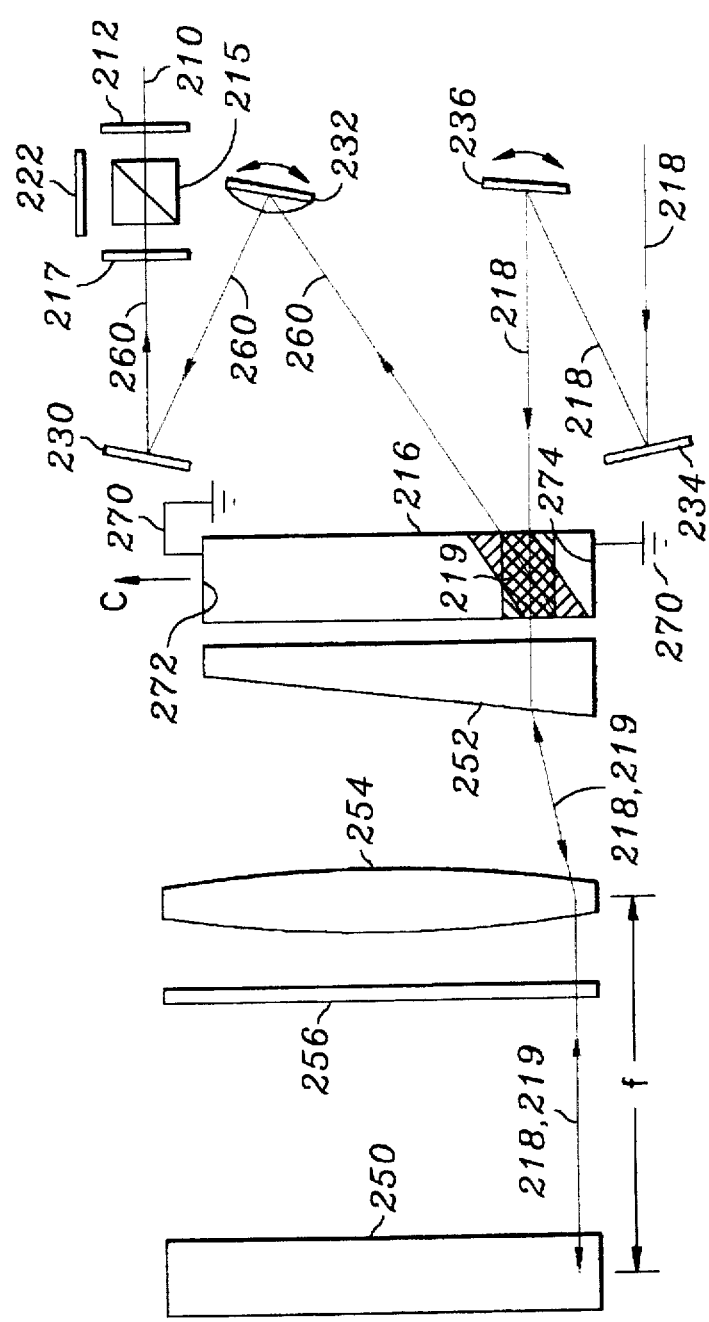
FIG. 7 is a schematic representation of the geometry for storing a plurality of holograms in a single storage medium via hybrid angular/spatial multiplexing according to the present invention, and more particularly showing the reading of holograms near the bottom of the storage medium.

As shown in FIGS. 6 and 7, during the read-out process, the reference beam 218 is directed to a desired location within the storage medium 216, as was done during the corresponding write process. An object beam is not utilized during the read-out process. The reference beam 218 is transmitted through the storage medium 216 and is directed to the phase conjugator 250 via a wedge 252 and is focused onto the phase conjugator 250 via focusing optics 254. The phase conjugator 250 is disposed one focal length of the focusing optics 254 therefrom. Optical switch 256 is activated so as to become transparent and thus allow the reference beam 218 to pass therethrough. Note that the optical switch 256 is de-activated so as to become opaque during the write process, and thereby does not allow either the reference beam 218 or the object beam 213 to be transmitted therethrough and thus be incident on phase conjugator 250.

The phase conjugator conjugates the reference beam 218 which is then reflected back, as conjugate reference beam 220, through the optical switch 256, focusing optics 254, and wedge 252 into the storage medium 216 so as to excite a corresponding conjugate object beam 260 which is directed by object scanning mirror 232 and fixed mirror 230 through polarization rotator 217. The polarization of the excited conjugate object beam 260 is rotated by polarization rotator 217 so as to be substantially one hundred percent reflected by beam splitter 215 onto detector array 222 for conversion into an electrical signal representative of the stored hologram.

It is understood that the exemplary hybrid angular/spatial holographic multiplexer described herein and shown in the drawings represents only a presently preferred embodiment of the invention. Indeed, those modifications and additions may be made to such embodiment without departing from the spirit and scope of the invention. For example, the shape of the storage medium may vary, as desired. Additionally, those skilled in the art will appreciate that various different optical elements may alternatively be utilized to direct the object and reference beams to the storage medium, phase conjugator, detector array, etc. Thus, these and other modifications and additions may be obvious to those skilled in the art and may be implemented to adapt the present invention for use in a variety of different applications.

What is claimed is:

1. A hybrid angular/spatial holographic multiplexer comprising:
   a) a storage medium;
   b) a reference beam scanner for scanning a reference beam spatially through said storage medium;
   c) an object beam scanner for scanning an object beam spatially through said storage medium;
   d) a spatial light modulator for modulating a laser beam to form the object beam;
   e) a phase conjugator for conjugating the reference beam during read-out so as to excite a corresponding conjugate object beam;
   f) a detector array for converting the conjugate object beam into an electrical signal representative thereof; and
   g) wherein said reference beam scanner and said object beam scanner cooperate to form a plurality of angular/spatial multiplexed holograms within said storage medium.

2. The hybrid angular/spatial holographic multiplexer as recited in claim 1 wherein said storage medium comprises $Fe:LiNbO_3$.

3. The hybrid angular/spatial holographic multiplexer as recited in claim 1 further comprising a circuit for electrically shorting at least two surfaces of said storage medium to effect discharge of photo-generated charges generated therein.

4. The hybrid angular/spatial holographic multiplexer as recited in claim 1 wherein said reference beam scanner and said object beam scanner are configured to spatially overlap adjacent angular/spatial multiplexed holograms so as to equalize exposure of the storage medium to the reference and object beams and, thereby, mitigate undesirable optical damage to the storage medium.

5. The hybrid angular/spatial holographic multiplexer as recited in claim 1 wherein said reference beam scanner and said object beam scanner are configured to uniformly distribute holograms through substantially the entire storage medium so as to enhance storage density.

6. The hybrid angular/spatial holographic multiplexer as recited in claim 1 wherein said reference beam scanner comprises an articulated mirror for directing the reference beam to different portions of said storage medium.

7. The hybrid angular/spatial holographic multiplexer as recited in claim 1 wherein said object beam scanner comprises an articulated Mangin mirror for directing the object beam to different portions of said storage medium.

8. The hybrid angular/spatial holographic multiplexer as recited in claim 1 further comprising an optical switch for preventing the reference beam from being incident upon the phase conjugator during write operations and for allowing the reference beam to be incident upon the phase conjugation during read-out operations.

9. The hybrid angular/spatial holographic multiplexer as recited in claim 1 further comprising:
   a) a wedge for directing the reference beam from the storage medium onto the phase conjugator; and
   b) a lens for focusing the reference beam directed by the wedge onto the phase conjugator.

10. The hybrid angular/spatial holographic multiplexer as recited in claim 1 further comprising:
    a) a beam splitter for transmitting the object beam to the storage medium during write operations and for reflecting the conjugate object beam to the detector array during read-out operations; and
    b) a polarization rotator for transmitting the object beam to the storage medium during write operations and for rotating the phase of the excited corresponding conjugate object beam during read-out operations so as to cause the beam splitter to reflect the excited corresponding conjugate object beam to said detector array.

11. The hybrid angular/spatial holographic multiplexer as recited in claim 1, wherein the spatial light modulator and detector array are formed to have the same pixel pitch.

12. The hybrid angular/spatial holographic multiplexer as recited in claim 1, wherein the spatial light modulator is formed to have a pixel pitch that is an integral multiple of the detector array pixel pitch.

13. A method for angularly and spatially multiplexing a plurality of holograms within a storage medium, said method comprising the steps of:
   a) writing a plurality of angularly/spatially multiplexed holograms at different locations within the storage medium using reference and object beams directed thereto via cooperating reference beam and object beam scanners, respectively; and
   b) reading out selected ones of said holograms via a reference beam directed to a desired location within the storage medium using the reference beam scanner, the reference beam being directed from the storage medium to a phase conjugator which conjugates the phase of the reference beam and directs the phase conjugated reference beam back to the same desired location within the storage medium to excite a corresponding conjugate object beam which is directed onto a detector array.

14. A method for angularly and spatially multiplexing a plurality of holograms within a storage medium, said method comprising the steps of:
   a) performing a write operation comprising the steps of:
      (i) directing a reference beam to a desired location within the storage medium via a reference beam scanner;
      (ii) directing an object beam to the same desired location within the storage medium via an object beam scanner;
      (iii) forming a hologram within the storage medium via interference of the reference beam and the object beam;
      (iv) repeating steps (i) through (iii) for a plurality of different desired locations within the storage medium for forming a plurality of angularly/spatially multiplexed holograms;
   b) performing a read-out operation comprising the steps of:
      (i) directing a reference beam to a desired location within the storage medium via a reference beam scanner;
      (ii) directing the reference beam from the storage medium to a phase conjugator;
      (iii) conjugating the phase of the reference beam; and
      (iv) directing the excited corresponding conjugate object beam onto a detector array via the object beam scanner.

15. The method as recited in claim 14 wherein the step of directing a reference beam to a desired location within the storage medium comprises directing a reference beam to a desired location within a storage medium comprised of $Fe:LiNbO_3$.

16. The method as recited in claim 14 wherein the steps of both performing a write operation and performing a read-out operation include electrically shorting surfaces of the storage medium to effect discharge of photo-generated charge therein.

17. The method as recited in claim 14 wherein the step of directing a reference beam to a desired location within the storage medium via a reference beam scanner and the step of directing an object beam to the same location within the storage medium via an object beam scanner, both during the write operation, comprise directing the reference beam and the object beam so as to spatially overlap adjacent angle/spatial multiplexed holograms in order to equalize exposure of the storage medium to the reference and object beams and, thereby, to mitigate undesirable optical damage to the storage medium.

18. The method as recited in claim 14 wherein the step of directing a reference beam to a desired location within the storage medium via a reference beam scanner and directing an object beam to the same desired location within the storage medium via an object beam scanner, both comprise forming holograms such that the holograms are uniformly distributed throughout substantially the entire storage medium so as to enhance storage density.

19. The method as recited in claim 14 wherein the step of directing a reference beam to a desired location within the storage medium comprises directing the reference beam via an articulated mirror.

20. The method as recited in claim 14 wherein the step of directing an object beam to a desired location within the storage medium comprises directing the object beam via an articulated Mangin mirror.

21. The method as recited in claim 14 further comprising the step of configuring an optical switch during write operations such that the object and reference beams are not transmitted therethrough to the phase conjugator and configuring the optical switch during read-out operations such that the reference beam is transmitted therethrough to the phase conjugator.

22. The method as recited in claim 14 further comprising the steps of:
   a) transmitting the object beam through a beam splitter and polarization rotator during write operations such that the object beam is substantially unaffected thereby; and
   b) transmitting the excited corresponding conjugate object beam through the same phase rotator during read-out operations such that the phase of the exited corresponding conjugate object beam is rotated 90 degrees thereby such that the excited corresponding conjugate object beam is reflected by the beam splitter to the detector array.

23. The method as recited in claim 14 wherein the step of performing a write operation comprises performing a write operation according to an exposure schedule so as to mitigate diffraction efficiency degradation of stored holograms.

24. The method as recited in claim 14 wherein the step of performing a write operation comprises spatially overlapping adjacent holograms so as to average the exposure of the storage medium to the reference and object beams and thus mitigate optical damage to the storage medium.

25. The method as recited in claim 14 wherein the step of performing a write operation comprises performing a plurality of write operations so as to uniformly distribute holograms throughout the entire storage medium and thus enhance the storage density thereof.

* * * * *